No. 659,038. Patented Oct. 2, 1900.
M. POLLACK.
HANGING DEVICE FOR PICTURES, &c.
(Application filed May 7, 1900.)
(No Model.) 2 Sheets—Sheet 1.
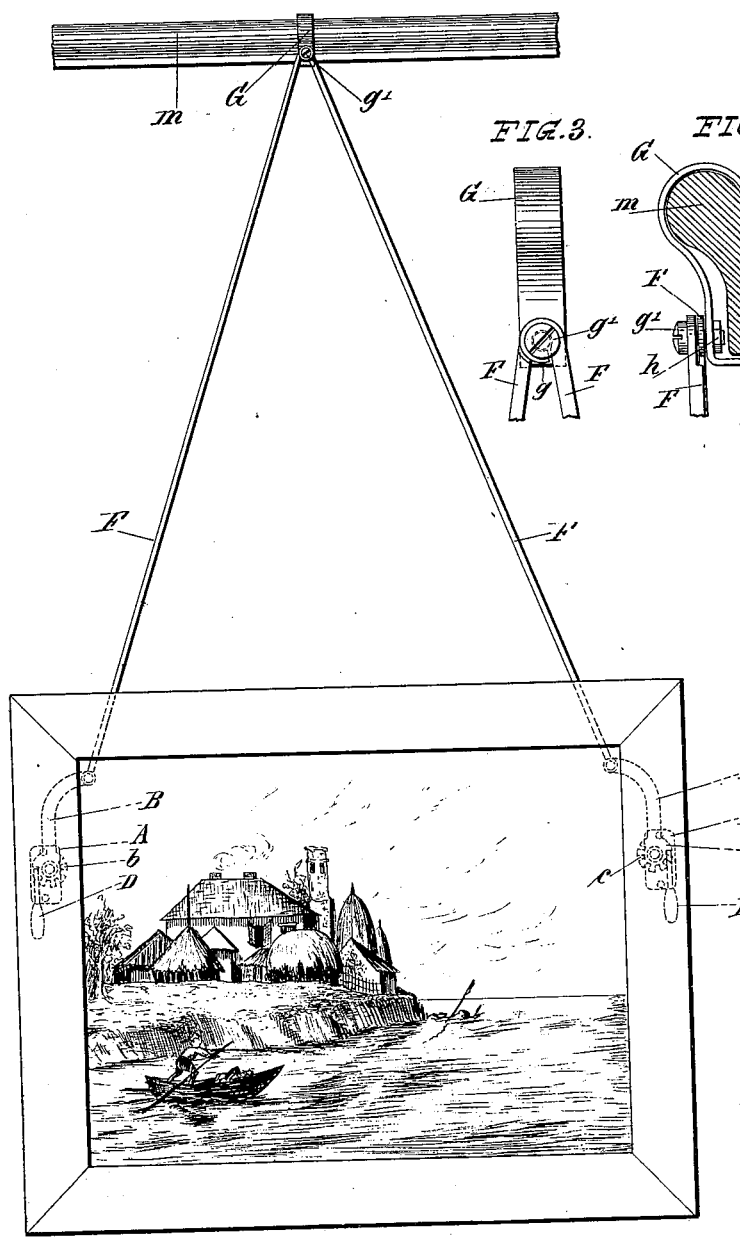
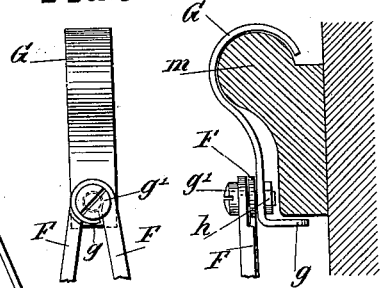
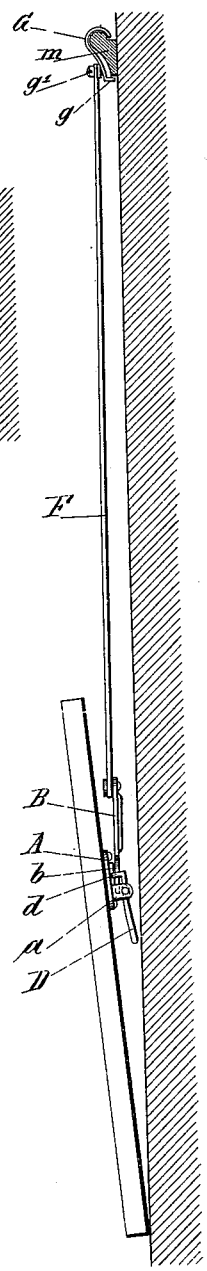
WITNESSES:
INVENTOR
Max Pollack
BY Sigmund Honig
His ATTORNEY
THE NORRIS PETERS CO., PHOTO-LITHO., WASHINGTON, D. C.

No. 659,038. Patented Oct. 2, 1900.
M. POLLACK.
HANGING DEVICE FOR PICTURES, &c.
(Application filed May 7, 1900.)
(No Model.) 2 Sheets—Sheet 2.
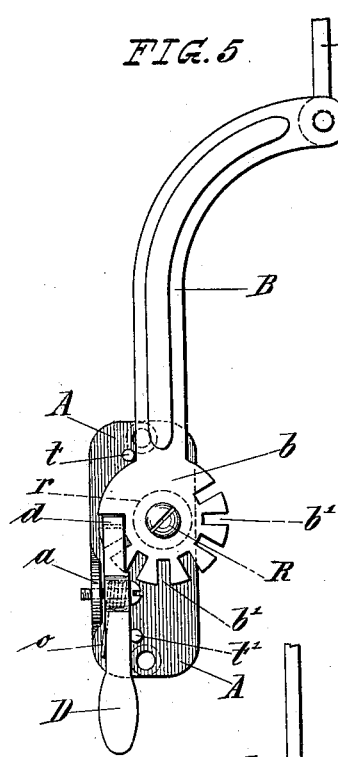
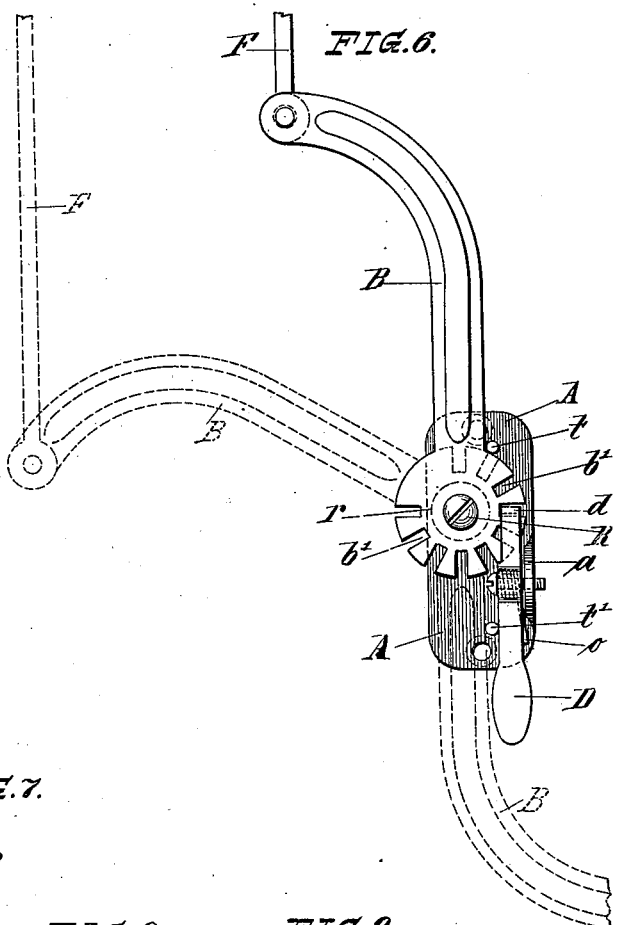
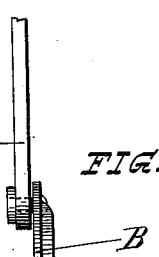
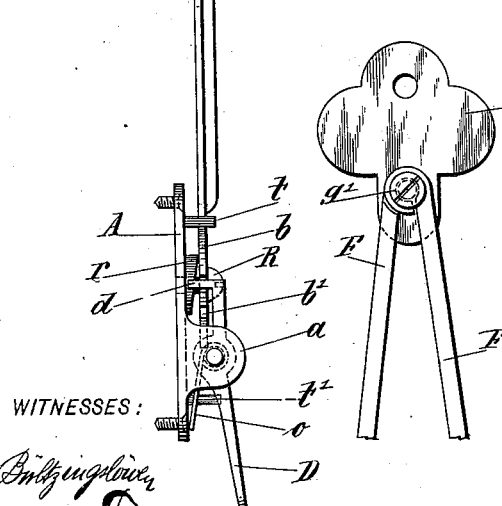
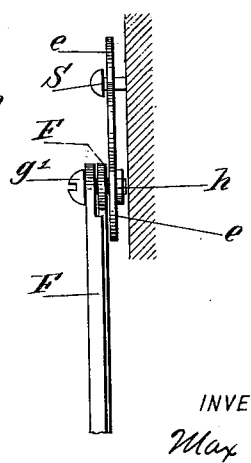
WITNESSES:
INVENTOR
Max Pollack
BY Sigmund Honig
His ATTORNEY

UNITED STATES PATENT OFFICE.

MAX POLLACK, OF NEW YORK, N. Y.

HANGING DEVICE FOR PICTURES, &c.

SPECIFICATION forming part of Letters Patent No. 659,038, dated October 2, 1900.

Application filed May 7, 1900. Serial No. 15,713. (No model.)

*To all whom it may concern:*

Be it known that I, MAX POLLACK, a citizen of the United States, residing at No. 418 East Seventy-seventh street, in the city of New York, borough of Manhattan, county of New York, and State of New York, have invented certain new and useful Improvements in Hanging Devices, of which the following is a specification.

The nature of the invention consists in the combination and arrangement of the various parts hereinafter described.

The object of the invention is to produce an improved and inexpensive device for hanging pictures, mirrors, and similar articles, all of which will be more fully understood from the following general description and the accompanying drawings and will be subsequently pointed out in the claims.

Figure 1 is a view of my newly-invented hanging apparatus as applied to hanging a picture. Fig. 2 is an edge view of the same. Figs. 3, 4, 5, 6, 7, 8, and 9 are views of details more fully hereinafter described.

Heretofore pictures, mirrors, and articles of a similar kind have been hung up with cords, wires, and similar appliances; but all of these have been found clumsy, troublesome, and unsightly. It is to obviate this difficulty that my present invention has been devised.

Referring to the drawings herewith, which are hereby made a part of this specification, F and F designate the rods on which the device is mounted. These may be of any approved material, shape, and size. These rods are pivoted at their upper end to the supporting-hook G by the screw $g'$ and nut $h$. The lower end of each rod is pivoted to a lever B. This lever B is also pivoted to a base-plate A by the screw R. Upon this base-plate A is formed a stud $r$. The top of this stud is cut at an angle, as illustrated by $r$ of Fig. 7. Upon this stud $r$, which is a part of base-plate A, is fastened pivotally and detachably the end $b$ of the lever B. This end $b$ of the lever B is cut with teeth $b'$, so as to form a segmental ratchet. In this ratchet $b'$ works the end $d$ of the pawl D, which is pivoted to a projection $a$ of the base-plate A. This pawl D is actuated by the spring $o$. Proper holes for screws are bored in the base-plate A, and two stop-pins $t$ and $t'$ are provided to limit the motion of the lever B. The supporting-hook G, which is pivoted to the upper ends of the rods F and F, is formed to engage the wall-molding $m$ and is turned at its lower end, so that the projecting end $g$ will, if the operator so desires, engage the lower edge of the molding $m$ and prevent the hook from coming off or, if it be so desired, may be swung out clear of the molding to allow the hook to come off. If it be found desirable, this hook G may be replaced by the plate $e$, adapted to engage a nail S in the wall, as illustrated in Figs. 8 and 9, the whole device to be substantially as illustrated in the drawings.

To use my invention, the base-plates A are screwed firmly to the back of a picture-frame, as illustrated in Fig. 1, so that the pawls D will be arranged as is there illustrated and the hook G hung over the molding $m$ as there illustrated. While the levers B are in the position there illustrated, the picture will be at its lowest point of suspension and the said levers will rest against the stop-pins $t$; but if the operator grasp the picture-frame with his hands on either side, so that one thumb will come upon each pawl D, he can by pressing the lever end of the pawl lift it out of the segmental ratchet $b'$. Then the picture can be raised upward, and the lever B will begin to move toward the position illustrated in dotted lines in Fig. 6. When a sufficient height has been attained, the pawl D is again allowed to fall into the ratchet $b'$, where it will be held by the resilience of the spring $o$, and the picture will be firmly and steadily retained in its position. If the pawl be now lifted out of the ratchet and the picture be pulled downward, as it comes down the lever B will move back toward its original position, as illustrated in Fig. 1, and may be retained in any desired place by replacing the pawl in the ratchet. It will be observed that the projection $g$ of the hook G, engaging the lower side of the molding $m$, prevents the hook from coming off the molding when the picture is lifted upward, as described. It will also be observed that on account of the slanting top of the stud $r$, on which the lever B is pivoted, the base-plate A will hold the picture so that it will not change its angle with the wall to any great extent while being lifted and lowered, as aforesaid.

It is obvious that this hanging device may be applied to mirrors, pictures, divers wall ornaments, and various other similar articles.

What I claim as my invention, and desire to secure by Letters Patent, is—

1. In a hanging device, substantially as described, the base-plate A, the lever B, adapted to engage hanging-rods with one end, cut into a segmental ratchet at the other, a stud having a slanting top, upon which said lever is pivoted, a pawl working in said ratchet and pivoted to a projection on said base-plate, and a spring actuating said pawl, all substantially as and for the purpose set forth.

2. In a hanging device the combination with the hook G, projection $g$, and rods F, pivoted to said hook, of the lever B, pivoted to rod F, ratchet $b'$ on the end of said lever, and pivoted to stud $r$, the base-plate A, and the stud $r$, thereon, the pawl D, pivoted on said base-plate A, and engaging said ratchet $b$, and spring $o$, actuating said pawl, all substantially as and for the purpose set forth.

3. In a hanging device, the combination with the two rods F, and F, arranged and adapted to be folded together, as set forth, and means as specified for supporting the same, of levers B, pivotally and detachably fastened to said rods, ratchets $b'$ formed on the lower ends of said levers, base-plates A, studs $r$, integral with said base-plates, and pivotally attaching the said levers thereto, the pawls D, adapted and arranged to engage said ratchets, and the springs $o$, arranged to actuate said pawls, all substantially as and for the purpose set forth.

4. In a hanging device, for pictures and like articles, the combination with the lever B, cut at its lower end into a segmental ratchet, of the base-plate A, the stud $r$, integral with the said base-plate, cut at an angle to said base-plate, and pivotally and detachably attaching said base-plate and said lever, the pawl D, pivoted to said base-plate and engaging said ratchet, the spring $o$, actuating said pawl, means as set forth, whereby said device is adapted to engage a wall-molding, whereby facility is afforded to said device, for raising and lowering a picture attached thereto, all substantially as and for the purpose set forth.

5. In a hanging device, the combination with the base-plate A, the stud $r$, integral therewith, and cut at an angle thereto as specified, of the lever B, pivotally and detachably connected to said base-plate by said stud, and arranged and adapted, to maintain unchanged, the angle between a picture attached thereto and a wall, while said picture is raised and lowered, means as set forth adapting said picture to be raised and lowered, means as described for connecting a picture to said base-plate, and means substantially as specified for supporting said hanging device, all substantially as and for the purpose set forth.

Signed at borough of Manhattan, in the county of New York, city and State of New York, this 30th day of April, A. D. 1900.

MAX POLLACK.

Witnesses:
HERMAN DINCIN,
MALVINA GITLER.